United States Patent
Magarill et al.

(10) Patent No.: US 11,640,050 B2
(45) Date of Patent: May 2, 2023

(54) MICRODISPLAY-BASED HEAD-UP DISPLAY SYSTEM

(75) Inventors: Simon Magarill, Cincinnati, OH (US); Dongha Kim, Yongin (KR)

(73) Assignee: EPIC OPTIX INC., Annapolis, MD (US)

( * ) Notice: Subject to any disclaimer, the term of this patent is extended or adjusted under 35 U.S.C. 154(b) by 818 days.

(21) Appl. No.: 13/277,199

(22) Filed: Oct. 19, 2011

(65) Prior Publication Data
US 2013/0100524 A1  Apr. 25, 2013

(51) Int. Cl.
*G02B 17/08* (2006.01)
*G02B 27/01* (2006.01)
*G02B 5/10* (2006.01)
*G02B 5/02* (2006.01)

(52) U.S. Cl.
CPC ......... *G02B 17/08* (2013.01); *G02B 27/0101* (2013.01); *G02B 5/02* (2013.01); *G02B 5/10* (2013.01); *G02B 2027/011* (2013.01); *G02B 2027/0118* (2013.01)

(58) Field of Classification Search
CPC ...... G02B 17/08; G02B 27/0101; G02B 5/02; G02B 5/10; G02B 2027/011; G02B 2027/0118; G02B 27/01; G02C 7/086; A63F 13/53; G01D 11/00
USPC .................................................. 359/630–633
See application file for complete search history.

(56) References Cited

U.S. PATENT DOCUMENTS

| | | |
|---|---|---|
| 3,940,204 A | 2/1976 | Withrington |
| 4,218,111 A | 8/1980 | Withrington et al. |
| 4,582,389 A | 4/1986 | Wood et al. |
| 4,669,810 A | 6/1987 | Wood |
| 4,711,512 A | 12/1987 | Upatnieks |
| 4,740,780 A * | 4/1988 | Brown et al. ..................... 345/7 |
| 4,763,990 A | 8/1988 | Wood |
| 5,007,711 A | 4/1991 | Wood et al. |
| 5,164,848 A * | 11/1992 | Firth et al. ...................... 359/13 |
| 5,576,887 A * | 11/1996 | Ferrin et al. ................... 359/631 |
| 5,684,634 A | 11/1997 | Rogers |
| 5,710,668 A | 1/1998 | Gohman et al. |
| 5,729,242 A * | 3/1998 | Margerum et al. ............... 345/7 |
| 6,111,701 A | 8/2000 | Brown |
| 6,157,291 A * | 12/2000 | Kuenster et al. ................. 345/8 |
| 6,262,849 B1 * | 7/2001 | Potin et al. ................... 359/631 |
| 6,567,014 B1 | 5/2003 | Hansen et al. |

(Continued)

OTHER PUBLICATIONS

Digital combiner achieves low cost and high reliability for head-up display applications, by Bernard Kress, Raulot Victorien, Patrick Meyrueis, SPIE Newsroom. DOI: 10.1117/2.1200904.1599, May 18, 2009, 4 pages, http://spie.org/x35062.xml?ArticleID=x35062.

(Continued)

*Primary Examiner* — Darryl J Collins
*Assistant Examiner* — Tamara Y. Washington (57) ABSTRACT

A head-up display (HUD) system is provided. The HUD system comprises a microdisplay-based projection system, a diffuser, a relay optical system, and a combiner. The microdisplay-based HUD system includes aberration correction capabilities and may easily and effectively replace a CRT-based HUD system in aircrafts while providing light-weight, multi-color, superior imaging capabilities with a large field-of-view.

14 Claims, 3 Drawing Sheets

(56) References Cited

U.S. PATENT DOCUMENTS

| | | | |
|---|---|---|---|
| 6,906,836 B2 | 6/2005 | Parker et al. | |
| 7,656,585 B1 | 2/2010 | Powell et al. | |
| 7,688,516 B2 | 3/2010 | Choi et al. | |
| 7,690,799 B2 | 4/2010 | Nestorovic et al. | |
| 7,924,146 B2 | 4/2011 | Seder et al. | |
| 7,982,959 B1* | 7/2011 | Lvovskiy et al. | 359/630 |
| 8,441,733 B2* | 5/2013 | Kessler | 359/630 |
| 8,520,310 B2* | 8/2013 | Shimizu | 359/630 |
| 2005/0225824 A1* | 10/2005 | Bell | G02B 3/0056 |
| | | | 348/E9.027 |
| 2006/0072209 A1* | 4/2006 | Karasawa | H04N 9/3105 |
| | | | 359/651 |
| 2007/0177275 A1* | 8/2007 | McGuire | 359/630 |
| 2011/0255174 A1* | 10/2011 | Bignolles | 359/632 |

OTHER PUBLICATIONS

Digital (Solid State) Head Up Displays (DHUDs), Technology Overview, Market Analysis and Forecast, by Mike Kalmanash, Dr. Norbert Hildebrand, Insight Media, Apr. 30, 2009, 26 pages, HUD-Webinar, www.insightmedia.info.

The future of head-up display technology, by Stephen Pope, AINonline, Jan. 1, 2006, 7 pages, http://www.ainonline.com/news/single-news-page/article/the-future-of-head-up-display-technology-1288.

Head-up display: not as easy as it seems!, by Peter Howells, SPIE Newsroom. DOI: 10.1117/2.1200709.0859, 2007, 2 pages.

* cited by examiner

MICRODISPLAY-BASED HEAD-UP DISPLAY SYSTEM

FIELD OF THE INVENTION

The present invention relates generally to the field of head-up display (HUD) systems, and, more specifically, to single or multi-color microdisplay-based HUD systems including aberration correction capabilities and having a large field-of-view.

BACKGROUND OF THE INVENTION

HUD systems have been well known for many years, and are used or are being considered for use in many applications such as aircraft, automobiles, medical, scientific data visualization, boats, large farm equipment, and heavy-duty construction equipment. Existing HUD systems create an image that is projected into the field-of-view of a user so that the user can glance at the projected image whenever the information contained in the image is needed. In aircraft applications, the pilot visualizes the HUD information in the field-of-view along with the outside world (i.e. real-world) in the flight path ahead and real objects on or near the flight path. More particularly, a HUD system for an aircraft conventionally includes a combiner through which the pilot views the outside world and, through reflection, the pilot can also view instrument information, symbology, weather, or other image data useful in flying the aircraft. Thus, the pilot need not lower or refocus his eyes to see, for example, certain instrument readings but can view the exterior scene (outside world) while vital instrument information is created in his line-of-sight. Several types of HUD systems are well known including conventional systems using a semi-reflective mirror or dielectric reflector combiner through which the pilot looks and upon which symbology is projected for viewing.

In some conventional holographic HUD systems, a relay lens system is used to project the desired instrumentation and/or symbology toward the holographic combiner at an angle relative to the combiner, with the relay lens system being provided with aberration correction features compensating for the aberrations produced by the combiner as a result of the large off-axis angle at which light is projected toward the combiner. At small or moderate off-axis angles, conventional relay optics are capable of providing an image with aberration correction, which, when viewed directly through the combiner, will appear to be a clear image. However, at large off-axis angles in a wide field-of-view system, it is quite difficult to compensate for the aberrations produced by the combiner without also providing aberration correction optical features in the combiner itself. And, even though aberration correction optical power may be built into the combiner, the combiner then unfortunately exhibits flare or multiple imaging. Thus, if a bright outside source is viewed through the combiner, such as runway lights at night, the appearance of flare or an undesired brightness around the object is perceived. If a bright extended object is viewed, multiple images appear around the bright object.

U.S. Pat. No. 4,763,990 discloses a conventional monochromatic CRT-based HUD system which utilizes a holographic spherical combiner 12/32, as well as a holographic mirror 28 to contribute toward correction of aberrations which are as a result of the large off-axis angle at which light from the CRT is projected toward the combiner. The HUD system also comprises relay optics 26 consisting of glass lenses with all spherical surfaces except for one cylindrical surface n. The relay optics 26 also contribute (i.e. cooperatively with the holographic mirror 28) to the correction of the aberrations.

The holographic approach had been conventionally desirable since it provided a simple, essentially flat combiner without additional optics. However, holograms, traditionally recorded, for example, in dichromated gelatin, are very expensive, have short lifetimes, and are sensitive to environmental conditions/changes such as vibrations, pressure, humidity, and temperature. The optical functionality of holographic mirrors is subject to being dependent on a limited (narrower) spectrum of light and/or the size of the light source. For example, a broader spectrum of light results in a decrease in image quality. Moreover, a larger light source (which in the case of a HUD system is required to fill the field-of-view/eye-motion box) results in a decrease in image quality. Holographic combiners are also notoriously known to be significantly limited in optical power.

Moreover, there is usually very limited space available in an aircraft cabin for a HUD system. At the same time, field-of-view should be as large as possible. A combination of these two factors leads to a necessity using concave geometry for a semi-reflective or holographic surface of combiner. Such geometry in combination with a combiner's angular orientation create severe non-symmetrical aberrations which need to be compensated for. Aberration compensation had mostly been accomplished by a combination of tilting and decentering of individual optical elements or groups of elements in optical system assemblies. However, tilting of individual optical elements creates fundamental difficulties with achieving required accuracy for system alignment.

Accordingly, the above conventional HUD systems all suffer from various drawbacks such as excessive weight and size (i.e. associated with CRT-based HUD systems), excessive aberrations, optical element alignment and machining/molding complexities in achieving required accuracy, excessive manufacturing costs, sensitivity to environmental conditions/changes, etc.

Thus, it is desirable to provide a HUD system which is able to overcome the above disadvantages.

Therefore, a need exists for a HUD system that is microdisplay-based, and which comprises a non-holographic combiner, and a relay optical system that comprises both lenses and lens groups that are non-tilted relative to the optical axis of the particular lens group where each lens resides (yet exhibit displacement normal to the optical axis), and that minimizes weight and size, minimizes aberrations, reduces optical element alignment and machining/molding complexities thereby achieving required accuracy, minimizes manufacturing costs, and is capable of operating under an enormous range of constantly varying environmental conditions/changes.

These and other advantages of the present invention will become more fully apparent from the detailed description of the invention hereinbelow.

SUMMARY OF THE INVENTION

The present invention is directed to a HUD system comprising a diffuser and a microdisplay-based projection system that projects an intermediate image onto a plane. The diffuser is positioned in the plane of the intermediate image such that the diffuser receives the intermediate image and diffuses the intermediate image with angularly spread light. The HUD system also comprises a relay optical system, wherein the relay optical system receives the diffused intermediate image from the diffuser. The HUD system further comprises a combiner, wherein the combiner comprises an anamorphic aspheric semi-reflective surface that partially reflects light received from the relay optical system to an observer of the head-up display system to thereby create a virtual image in the far field, and wherein the semi-reflective surface partially transmits light from the outside world to the observer. The anamorphic aspheric semi-reflective surface of the combiner is preferably a biconic surface having two radii and two conic constants. The HUD system yet further may comprise a mirror, wherein the mirror may comprise an anamorphic aspheric reflective surface positioned between the relay optical system and the combiner. The anamorphic aspheric reflective surface of the mirror is preferably a biconic surface having two radii and two conic constants. The relay optical system, the combiner, and, when utilized, the anamorphic aspheric mirror are provided with aberration correction capabilities to compensate for aberrations produced by the combiner as a result of a large off-axis angle at which the light is received by the combiner's anamorphic aspheric semi-reflective surface from the relay optical system, or from the mirror, if utilized.

The relay optical system comprises a first lens group and a second lens group. Each lens within the first lens group is aligned along a first optical axis. Each lens within the second lens group is aligned along a second optical axis. The first optical axis is substantially parallel to the second optical axis. The first optical axis is offset perpendicularly from the second optical axis by a distance $\Delta_A$. The distance $\Delta_A$ is preferably in the range of −50 mm to 50 mm. The first lens group and the second lens group consist of lenses substantially free of tilting with respect to the first optical axis and the second optical axis. The relay optical system preferably consists of only the first lens group and the second lens group. The relay optical system also preferably comprises at least one lens with a toroidal, aspherical, or biconic surface.

The diffuser preferably comprises an item selected from the group consisting of diffusing film, random microstructures on glass, lenslet array on glass, array of microprisms on glass, and combinations thereof.

The microdisplay-based projection system is preferably of DLP®-type and which comprises a DLP® modulator. Alternatively, the microdisplay-based projection system may be of LCoS-type or transmissive LCD-type.

BRIEF DESCRIPTION OF THE DRAWINGS

For the present invention to be clearly understood and readily practiced, the present invention will be described in conjunction with the following figures, wherein.

DETAILED DESCRIPTION OF THE PREFERRED EMBODIMENTS

It is to be understood that the figures and descriptions of the present invention may have been simplified to illustrate elements that are relevant for a clear understanding of the present invention, while eliminating, for purposes of clarity, other elements found in a typical HUD system. Those of ordinary skill in the art will recognize that other elements may be desirable and/or required in order to implement the present invention. However, because such elements are well known in the art, and because they do not facilitate a better understanding of the present invention, a discussion of such elements is not provided herein. It is also to be understood that the drawings included herewith only provide diagrammatic representations of the presently preferred structures of the present invention and that structures falling within the scope of the present invention may include structures different than those shown in the drawings. Reference will now be made to the drawings wherein like structures are provided with like reference designations.

Figure 1:
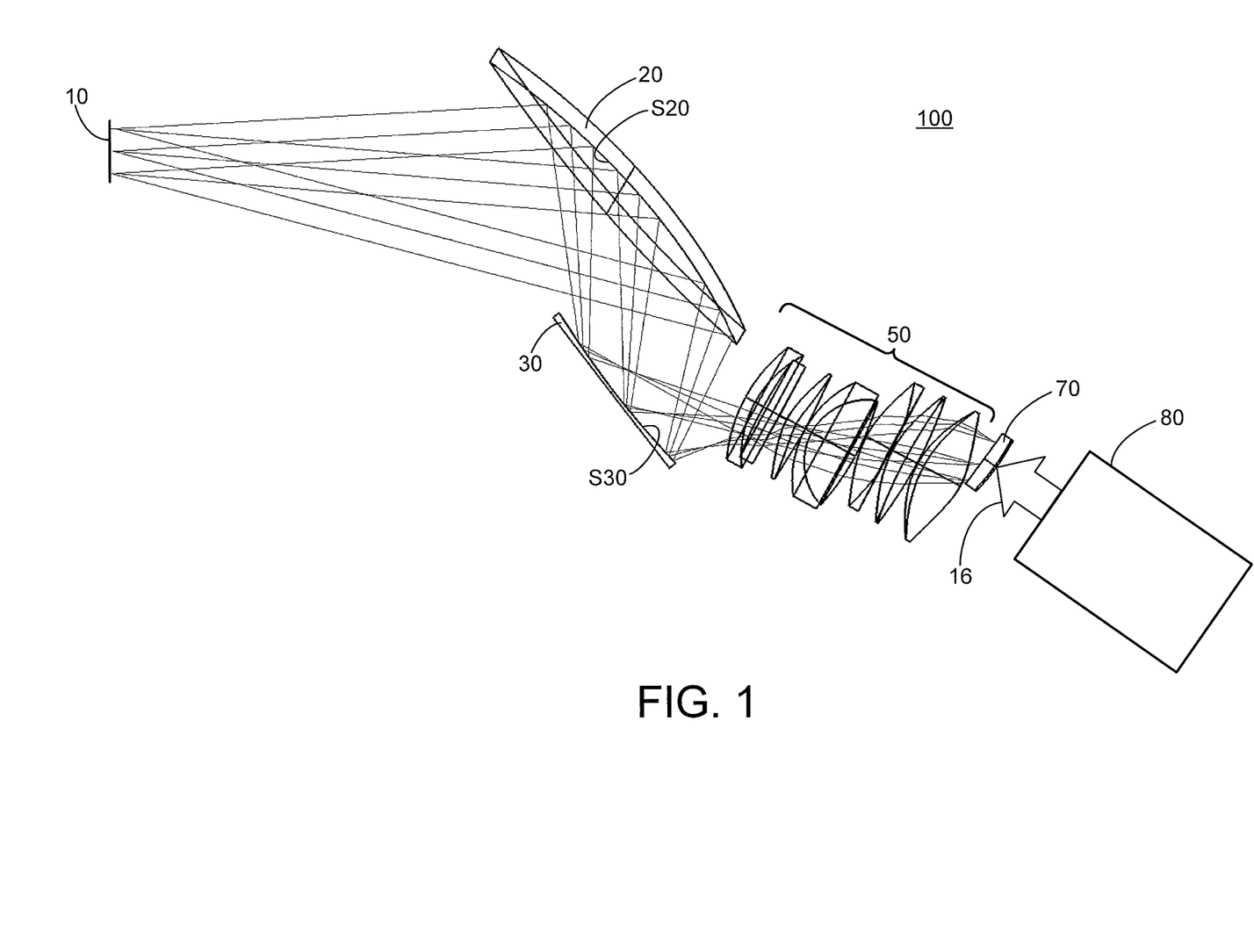
FIG. 1 is a wire-frame side view of a HUD system that includes a microdisplay-based projection system, diffuser, relay optical system, mirror and anamorphic aspheric combiner, in accordance with a preferred embodiment of the present invention.

FIG. 1 is a wire-frame side view of an exemplary HUD system 100 that includes a microdisplay-based projection system 80, diffuser 70, relay optical system 50, mirror 30 and anamorphic aspheric combiner 20, in accordance with a preferred embodiment of the present invention. FIG. 1 also illustrates the HUD system 100 including an eye-motion box 10.

The microdisplay-based projection system 80 is of DLP®-type and which comprises a DLP® modulator. Alternatively, the microdisplay-based projection system 80 may be of LCoS-type or transmissive LCD-type (or high temperature polysilicon (HTPS)-type).

Diffuser 70 comprises an item selected from the group consisting of diffusing film, random microstructures on glass, lenslet array on glass, array of microprisms on glass, and combinations thereof. In the exemplary embodiment illustrated in FIG. 2, diffuser is combined with an optical element to thereby form a diffuser lens (still depicted as element 70). This lens portion of the diffuser lens may function as part of the microdisplay-based projection system 80 or the lens portion may function separately from the microdisplay-based projection system 80. Alternatively, the diffuser may be a separate element from any lens portion. In any of these configurations, diffuser 70 includes diffusing surface S70. The microdisplay-based projection system 80 projects an intermediate image (of, for example, a DLP® modulator) onto a plane (i.e. diffusing surface S70). In other words, diffusing surface S70 is positioned in the plane of the intermediate image such that the diffuser 70 receives the intermediate image and diffuses the intermediate image with angularly spread light. The location of the intermediate image/diffuser is critical to the superior functioning of the HUD system 100. In particular, the intermediate image/diffuser must be located prior to the relay optical system 50 in order for the relay optical system 50 to adequately and uniquely provide sufficient power and aberration correction capabilities to the projected angularly spread image light to achieve a wide field-of-view and provide superior image quality for any position of the observer's eyes inside the eye-motion box 10. In significant contrast, the HUD system in U.S. Pat. No. 4,763,990 clearly lacks these benefits since the intermediate image 54 (U.S. Pat. No. 4,763,990's FIG. 2) is located subsequent the relay optics 26.

To assist in understanding why it is necessary for the present invention to require the intermediate image to be positioned on a plane where the diffuser resides, exemplary conditions are considered:

Typical Eye-Motion Box 3"×5"×6" (75 mm×125 mm×150 mm)

Typical Field-of-View 10° vertical×15° horizontal

Etendue π×75×125×sin(10°)×sin(15°)=1323 mm2×steradian

Largest available DLP® is 20.736 mm×12.96 mm (diagonal 0.95")

DLP® etendue is π×20.736×12.96×sin(12°)=36.5 mm²× steradian

DLP etendue is smaller than etendue in the viewer space. In other words, for ideal direct imaging systems (i.e. without employing an intermediate image), the design will not be able to maintain the desired field-of-view within the required eye-motion box. To increase light beam etendue inside HUD system 100, we discovered a diffuser is needed. To maintain integrity of light beam, the diffuser needs to be placed in the plane of the intermediate image.

The diffuser 70 is required to increase the angular extent of the light by changing the angular distribution of light. The diffuser allows expansion of light beam to cover an increased/wider field-of-view and to fill the specified eye-motion box 10. It is noted that U.S. Pat. No. 4,763,990 lacks a diffuser entirely and therefore lacks a wide field-of-use resulting from a combination of no diffuser and the intermediate image location as mentioned above. Various types of diffusers may be utilized as part of the present invention. Diffusers may range, for example, from ground glass to an engineered diffuser as produced by Luminit LLC (http://www.luminitco.com). The diffuser may be laminated on plane parallel glass or on the plano side of an optical element as shown in the exemplary embodiment in FIGS. 1 and 2. It is preferable to use a high temperature diffuser. For certain angular orientations of the HUD system 100, sunlight can propagate through the HUD system 100 in a reverse direction (i.e. from combiner 20 towards diffuser 70) and such light will be focused on the diffuser 70. A glass-on-glass diffuser product from Luminit LLC can sustain this high temperature condition. This type of high temperature diffuser is preferably holographically recorded and has a randomized surface relief structure replicated in a glass surface on a float glass or UV silica substrate.

Since we use a planar intermediate image/diffuser configuration, the entire intermediate image is diffused uniformly. This is in significantly contrast to the intermediate image 54 in U.S. Pat. No. 4,763,990 which utilizes only a curved intermediate image with absolutely no diffusion thereof.

Figure 2:
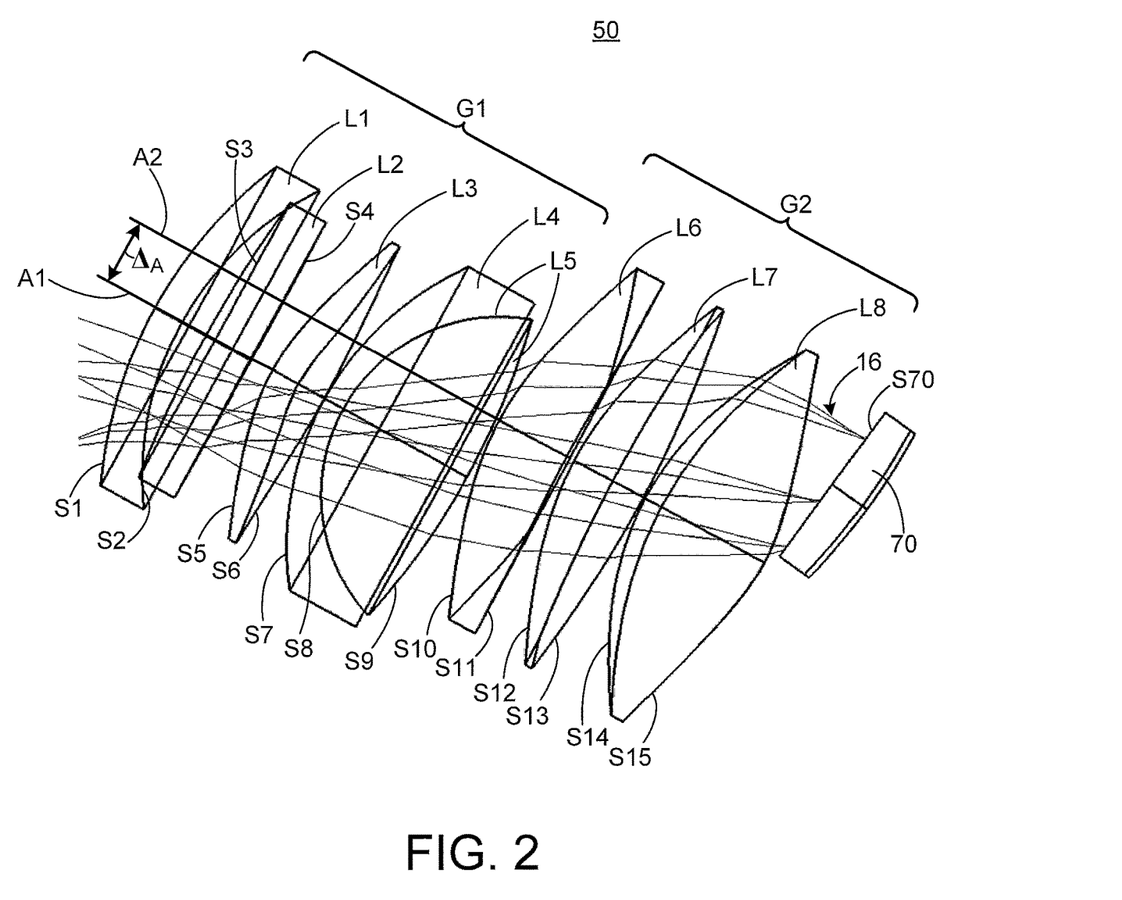
FIG. 2 is an enlarged, wire-frame side view of the relay optical system shown in FIG. 1.

FIG. 2 is an enlarged, wire-frame side view of the relay optical system 50 shown in FIG. 1. The relay optical system 50 receives the diffused intermediate image from the diffuser 70. As illustrated in FIG. 2, relay optical system 50 includes lenses L1-L8. Lens L1 includes surfaces S1 and S2. Lens L2 includes surfaces S3 and S4. Lens L3 includes surfaces S5 and S6. Lenses L4/L5 include surfaces S7, S8, and S9. Lens L6 includes surfaces S10 and S11. Lens L7 includes surfaces S12 and S13. Lens L8 includes surfaces S14 and S15. Relay optical system 50 may be divided into two or more lens groups with each group exhibiting relative displacement from one another. In the exemplary embodiment of FIG. 2, relay optical system 50 consists of only two lens groups G1, G2. Lens group G1 includes Lenses L1-L5. Lens group G2 includes Lenses L6-L8. Each lens within lens group G1 (i.e. lenses L1-L5) is aligned along optical axis A1. Each lens within lens group G2 (i.e. lenses L6-L8) is aligned along optical axis A2. Optical axis A1 is substantially parallel to optical axis A2. Optical axis A1 is offset (i.e. displaced/decentered) perpendicularly from optical axis A2 by a distance $\Delta_A$. $\Delta_A$ is preferably in the range of −50 mm to 50 mm. Lens group G1 and lens group G2 consist of lenses substantially free of tilting with respect to the optical axis A1 and optical axis A2. Again, the relay optical system 50 of the present invention does not have tilted optical elements or group(s) of optical elements but utilizes displacement only. In other words, the lenses are oriented perpendicularly to the optical axis of that particular lens group. As a result, all mechanical parts (e.g. barrels, mounts, spacers) may be machined and potentially molded with required accuracy.

The relay optical system 50 comprises lenses with cylindrical, toroidal, spherical, aspherical, and biconic surfaces, and more specifically, comprises at least one lens with a toroidal, aspherical, or biconic surface. In the example shown in FIG. 2, lenses L1, L2, L4/L5 have spherical surfaces, lens L6 has a biconic surface (S10 as per Table 1 below) and an aspherical surface (S11), lens L7 has a spherical surface (S12) and a biconic surface (S13), lenses L3 and L8 have biconic surfaces only.

The relay optical system 50 is the assembly of refractive optical elements which cooperate with mirror 30 and combiner 20 to create a virtual image taken from the diffuser 70 focused substantially at infinity. As mentioned above, the relay optical system 50 consists of two groups which are displaced relative to each other. There is no tilt of lenses in each group and lens groups relative to each other. Such arrangement, together with the curvature on mirror 30 and on reflective surface S20 (FIG. 1) of combiner 20 provide required aberration correction in a significant amount. There is no need for a holographic element for the combiner for additional aberration correction.

FIG. 1 also illustrates a combiner 20 within HUD system 100. Combiner 20 comprises an anamorphic aspheric semi-reflective surface S20 that partially reflects light received from the relay optical system 50 to an observer of the HUD system 100 to thereby create a virtual image in the far field (i.e. focused substantially at infinity), and wherein the anamorphic aspheric semi-reflective surface S20 partially transmits light from the outside world (i.e. the outside/real world view) to the observer. The observer is able to view the virtual image (originating from the microdisplay-based projection system 80) and the outside world light/view simultaneously from within the eye-motion box 10. It is noted that a portion of the light received from the relay optical system 50 to an observer of the HUD system 100 that is not partially reflected by surface S20 is partially transmitted through surface S20 thereby forming wasted light. Moreover, a portion of the light from the outside world to the observer that is not partially transmitted through surface S20 is partially reflected by surface S20 thereby forming additional wasted light.

In the exemplary embodiment, the anamorphic aspheric semi-reflective surface S20 is a biconic surface having two radii and two conic constants. In other cases, surface S20 can have a truly anamorphic aspherical geometry with high-order polynomial coefficients. In addition to magnifying the generated image formed by the microdisplay-based projection system 80, the relay optical system 50 is designed to cooperate with the anamorphic aspheric semi-reflective surface S20 of the combiner 20 and surface S30 of the mirror 30 to compensate for aberrations introduced due to the large off-axis angle of the combiner 20. As conventionally known, the outer shape of combiner may have geometry to compensate for parallax for the light transmitted through the combiner from the outside world to the observer.

In the present invention, an aspherical combiner 20 and mirror 30 are utilized, and magnify image data projected from the microdisplay-based projection system 80 in the non-axial direction and reflect the magnified image data. Further, the aspherical combiner 20, mirror 30, and relay optical system 50 have a concave shape so as to provide a magnified virtual image to an observer. It is preferable that HUD systems achieve wide field-of-view. More specifically, the display device must be capable of creating a virtual image of a required field-of-view without generating distortion.

FIG. 1 further illustrates the preferable use of an optional anamorphic aspherical mirror 30 within HUD system 100. Mirror 30 includes anamorphic aspherical reflective surface S30 and is positioned between the relay optical system 50 and the combiner 20. When the minor 30 is utilized within HUD system 100, anamorphic aspherical reflective surface S30 is designed to cooperate with both the anamorphic aspheric semi-reflective surface S20 of the combiner 20 and the relay optical system 50 to compensate for aberrations introduced due to the large off-axis angle of the combiner 20. Thus, in other words, the relay optical system 50, the combiner 20, and the anamorphic aspherical minor 30 (i.e. when utilized) are provided with aberration correction capabilities to compensate for aberrations produced by the combiner as a result of a large off-axis angle at which the light is received by the combiner's anamorphic aspheric semi-reflective surface from the relay optical system 50, or from the mirror 30, if utilized. Additionally, the relay optical system 50, the combiner 20, and the minor 30 (i.e. when utilized) all contribute to creating the image of the diffuser focused substantially at infinity within a large field-of-view.

Figure 3:
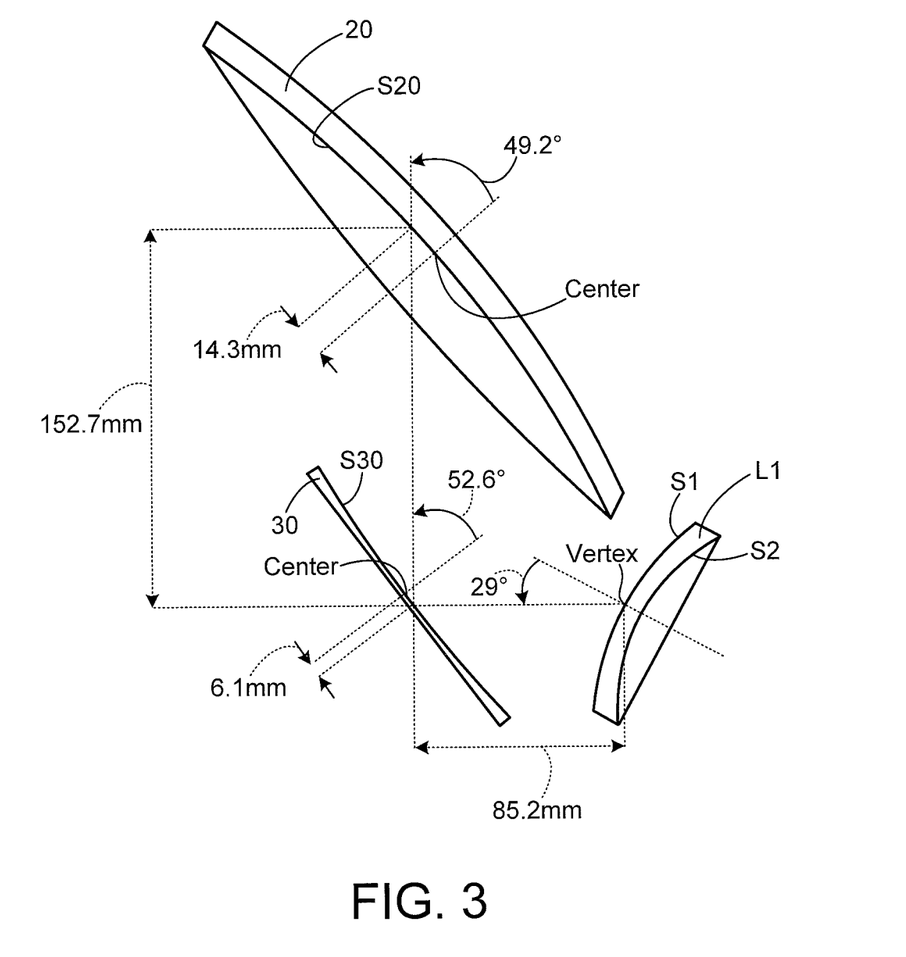
FIG. 3 is an enlarged, cross-sectional side view of a portion of the HUD system shown in FIG. 1.

FIG. 3 is an enlarged, cross-sectional side view of a portion of the HUD system 100 shown in FIG. 1. The values mentioned in FIG. 3 describe the position/orientation of the combiner 20 and mirror 30 in relation to lens L1 of relay optical system 50 for FIG. 1's exemplary design. These values combined with the optical prescriptions in the below Tables 1-3 and the corresponding explanations therefor provide sufficient information to enable manufacturing/understanding of the layout of the exemplary configuration of HUD system 100 shown in FIG. 1.

The microdisplay-based projection system 80 employed in the present invention comprises an illumination system that delivers light from the light source(s) to, for example, a DLP® with uniform spatial distribution and within required angular space. The present invention may utilize any known type of illuminator such as the type based on a light pipe or lenslet array integrator, and with a reflective or refractive condenser. It may, for example, employ an LED, UHP lamp, laser, or any other suitable light source. The light source may be monochrome (e.g. green LED) or, more preferably, multi-color (e.g. RGB LEDs, white LEDs, or a UHP lamp).

The following Tables 1-3 describe the layout, features, shapes, and material of the optical elements within an exemplary HUD system 100 of the type shown in FIGS. 1-3. The THICKNESS shown in the tables is the axial distance to the next surface.

TABLE 1

Optical Prescription Describing Lenses L1-L8 within the Relay Optical System 50

GENERAL LENS DATA:

| ELEMENT | SURFACE # | SURFACE TYPE | R | THICKNESS | MATERIAL |
|---|---|---|---|---|---|
| L1 | S1 | spherical | 104.409 | 7.24 | S-TIH11 |
|  | S2 | spherical | 75.068 | 6.43 |  |
| L2 | S3 | spherical | 287.768 | 12.29 | S-BAH10 |
|  | S4 | spherical | −2586.190 | 5.53 |  |
| L3 | S5 | biconic |  | 14.00 | PMMA |
|  | S6 | biconic |  | 0.10 |  |
| L4/L5 | S7 | spherical | 72.215 | 5.00 | S-TIH14 |
|  | S8 | spherical | 42.120 | 33.42 | S-BSL7 |
|  | S9 | spherical | −175.825 | 0.20 |  |
| L6 | S10 | biconic |  | 18.00 | PMMA |
|  | S11 | aspherical | 274.81 | 2.00 |  |
| L7 | S12 | spherical | 74.073 | 18.52 | PMMA |
|  | S13 | biconic |  | 0.50 |  |
| L8 | S14 | biconic |  | 32.15 | PMMA |
|  | S15 | biconic |  | 2.00 |  |

BICONIC SURFACES DATA:

| SURFACE # | $R_x$ | $cc_x$ | $R_y$ | $cc_y$ |
|---|---|---|---|---|
| S5 | 54.204 | −5.879 | 0.000 | 0.000 |
| S6 | −206.128 | −256.890 | −123.397 | 2.005 |
| S10 | 70.462 | −5.275 | 46.024 | −1.848 |
| S13 | −269.992 | −8.693 | −93.453 | −5.313 |
| S14 | 66.267 | −1.423 | 290.814 | 3.355 |
| S15 | −48.353 | −9.664 | 0.000 | 0.000 |

ASPHERICAL SURFACE DATA:

| SURFACE # | cc | D | E | F | G | H | I |
|---|---|---|---|---|---|---|---|
| S11 | 0.000 | −2.857E−06 | 5.169E−09 | −6.396E−12 | 4.072E−15 | −1.229E−18 | 1.400E−22 |

The amount of displacement (i.e. decentering) of the lenses L1-L5 with respect to lenses L6-L8 is $\Delta_A$ and in this exemplary configuration is 15.6 mm.

Sag of aspherical surface S11 is defined by the following formula:

$$z = \frac{R^{-1} \times r^2}{1 + \sqrt{1 - (1+cc) \times R^{-2} \times r^2}} + D \times r^4 + E \times r^6 + F \times r^8 + G \times r^{10} + H \times r^{12} + I \times r^{14}$$

where R=radius; r=radial coordinate on the surface; cc=conic constant; and D,E,F,G,H,I=polynomial coefficients Sag of biconic surfaces S5, S6, S10, S13, S14, S15 are defined by the following formula:

$$z = \frac{R_x^{-1} \times x^2 + R_y^{-1} \times y^2}{1 + \sqrt{1 - (1+cc_x) \times R_x^{-2} \times x^2 - (1+cc_y) \times R_y^{-2} \times y^2}}$$

where $R_x$ and $R_y$=radius in x and y directions, respectively; and $cc_x$ and $cc_y$=conic constants in x and y directions, respectively Anamorphic aspherical surfaces are a more general type of biconic surface. It includes symmetric coefficients A and asymmetric coefficients B in the following sag equation:

$$z = \frac{R_x^{-1} \times x^2 + R_y^{-1} \times y^2}{1 + \sqrt{1 - (1+cc_x) \times R_x^{-2} \times x^2 - (1+cc_y) \times R_y^{-2} \times y^2}} + \sum_{n=2}^{10} A_n[(1-B_n)x^2 + (1+B_n)y^2]^n$$

TABLE 2

Optical Prescription Describing Combiner 20
COMBINER'S BICONIC SURFACE DATA:

| SURFACE # | $R_x$ | $cc_x$ | $R_y$ | $cc_y$ |
|---|---|---|---|---|
| S20 | −235.287 | −0.451 | 583.692 | 1.382 |

Aperture: elliptical with clear aperture $CA_x$ = 210 mm, $CA_y$ = 240 mm.
Aperture is decentered in Y-direction an amount of −160 mm.

TABLE 3

Optical Prescription Describing Mirror 30
MIRROR'S BICONIC SURFACE DATA:

| SURFACE # | $R_x$ | $cc_x$ | $R_y$ | $cc_y$ |
|---|---|---|---|---|
| S30 | infinity | 0.000 | 622.578 | −20.580 |

Aperture: rectangular with clear aperture $CA_x$ = 140 mm, $CA_y$ = 150 mm.
Aperture is decentered in Y-direction an amount of 58 mm.

The thickness of the combiner 20 may preferably be chosen in the range of 5-20 mm. Larger thicknesses increase the parallax for the light transmitted therethrough, whereas smaller thicknesses reduce the rigidity of the combiner which can lead to reflective surface deformation and diminished image quality. The thickness of mirror 30 is irrelevant because it is a first-surface mirror. A preferable material for combiner 20 is plastic such as PMMA (polymethyl methacrylate) or Zeonex® or any other optically clear plastic. A preferable material for mirror 30 is any plastic which can be machined with, for example, a single point diamond-turning process.

In Table 1, the units for columns R and THICKNESS in GENERAL LENS DATA, the units for columns $R_x$ and $R_y$ in BICONIC SURFACES DATA, the units for columns $R_x$ and $R_y$ in Table 2's COMBINER'S BICONIC SURFACE DATA, and the units for columns $R_x$ and $R_y$ in Table 3's MIRROR'S BICONIC SURFACE DATA are all in millimeters (mm). The units for columns D, E, F, G, H, I in Table 1's ASPHERICAL SURFACE DATA are in relative units.

The contemplated modifications and variations specifically mentioned above and below are considered to be within the spirit and scope of the present invention.

Those of ordinary skill in the art will recognize that various modifications and variations may be made to the embodiments described above without departing from the spirit and scope of the present invention. For example, the HUD system 100 described above utilizes a combiner 20, mirror 30, and relay optical system 50-all three of which contribute to the correction of aberrations produced by the combiner as a result of the large off-axis angle at which light is projected toward the combiner. However, any one or two of these optical elements may alternatively be employed with aberration correction capabilities in the HUD system 100 of the present invention. Also, any number of folding mirrors may additionally be included anywhere in the HUD system 100. Of course, it is to be understood that depending on the type of microdisplay-based projection system 80 employed in HUD system 100, the optical prescriptions for the remaining optical elements within the HUD system 100 may vary accordingly from that as described above. Further, although the present invention is described above with reference to a HUD system 100 employing a combiner 20 which is separate from a windscreen or windshield, the HUD system 100 of the present invention may alternatively employ a windscreen (or windshield) preferably having the corresponding features, shape, and/or material of the above-described combiner 20 built therein to thereby function equivalently to the combiner 20. In this configuration, a separate combiner would be omitted from the HUD system 100. Furthermore, although the present invention is described above with reference to a multi-color type HUD system, HUD systems of, for example, monochromatic or infrared type, may utilize the features of the present invention. Moreover, although the present invention is described above with reference to the utilization of a HUD system 100 in an aircraft, the HUD system may be employed in other scenarios. For example, the HUD system of the present invention may alternatively be employed in stationary mounting scenarios or other vehicles such as automobiles, helicopters, or ships. It is therefore to be understood that the present invention is not limited to the particular embodiments disclosed above, but it is intended to cover such modifications and variations as defined by the following claims.

What is claimed is:

1. A head-up display systems comprising:
   a microdisplay-based projection system that projects an intermediate image onto a plane;
   a diffuser, wherein the diffuser is positioned in the plane of the intermediate image such that the diffuser receives the intermediate image and diffuses the intermediate image with angularly spread light;
   a relay optical system, wherein the relay optical system receives the diffused intermediate image from the diffuser and includes a first lens group and a second lens group, wherein each lens within the first lens group is aligned along a first optical axis, wherein each lens within the second lens group is aligned along a second optical axis, wherein the first optical axis is parallel to the second optical axis, and wherein the first optical axis is offset perpendicularly from the second optical axis by a distance $\Delta_A$; and a combiner, wherein the combiner comprises an anamorphic aspheric semi-reflective surface that partially reflects light received from the relay optical system to an observer of the head-up display system to thereby create a virtual image in the far field, wherein the semi-reflective surface partially transmits light from the outside world to the observer, and wherein the combiner is positioned to receive light from the relay optical system at large off-axis angles and deliver aberration corrected light to the viewer.

2. The head-up display system of claim 1, wherein the anamorphic aspheric semi-reflective surface of the combiner is a biconic surface having two radii and two conic constants.

3. The head-up display system of claim 1 further comprising a mirror, wherein the mirror comprises an anamorphic aspheric reflective surface positioned between the relay optical system and the combiner.

4. The head-up display system of claim 3, wherein the relay optical system, the combiner, and the mirror are provided with aberration correction capabilities to compensate for aberrations produced by the combiner as a result of a large off-axis angle at which the light is received by the anamorphic aspheric semi-reflective surface from the mirror.

5. The head-up display system of claim 3, wherein the anamorphic aspheric reflective surface of the mirror is a biconic surface having two radii and two conic constants.

6. The head-up display system of claim 1, wherein the relay optical system and the combiner are provided with aberration correction capabilities to compensate for aberrations produced by the combiner as a result of a large off-axis angle at which the light is received by the anamorphic aspheric semi-reflective surface from the relay optical system.

7. The head-up display system of claim 1, wherein the distance $\Delta_A$ is in the range of −50 mm to 50 mm.

8. The head-up display system of claim 1, wherein the first lens group and the second lens group consist of lenses substantially free of tilting with respect to the first optical axis and the second optical axis.

9. The head-up display system of claim 1, wherein the relay optical system consists of only the first lens group and the second lens group.

10. The head-up display system of claim 1, wherein the relay optical system comprises at least one lens with a toroidal, aspherical, or biconic surface.

11. The head-up display system of claim 1, wherein the diffuser comprises an item selected from the group consisting of diffusing film, random microstructures on glass, lenslet array on glass, array of microprisms on glass, and combinations thereof.

12. The head-up display system of claim 1, wherein the microdisplay-based projection system includes a digital light projecting (DLP®) type modulator.

13. The head-up display system of claim 1, wherein the microdisplay-based projection system includes a liquid crystal on silicon (LCoS) device.

14. The head-up display system of claim 1, wherein the microdisplay-based projection system includes a transmissive liquid crystal display (LCD) device.

* * * * *